United States Patent [19]
Otten et al.

[11] Patent Number: 4,902,834
[45] Date of Patent: * Feb. 20, 1990

[54] PROCESS FOR PREPARING CAPPED POLYOXYALKYLENE BLOCK POLYETHERS

[75] Inventors: Jay G. Otten, Flat Rock; Roger A. Ott, Grosse Ile, both of Mich.

[73] Assignee: BASF Corporation, Parsippany, N.J.

[*] Notice: The portion of the term of this patent subsequent to Aug. 16, 2005 has been disclaimed.

[21] Appl. No.: 238,644

[22] Filed: Aug. 30, 1988

Related U.S. Application Data

[63] Continuation of Ser. No. 933,143, Nov. 21, 1986, abandoned.

[51] Int. Cl.$^4$ .............................................. C07L 41/03
[52] U.S. Cl. ................................. 568/608; 568/607; 568/606; 568/618; 568/619; 568/620; 564/399; 564/475; 536/120
[58] Field of Search ............... 568/608, 607, 606, 618, 568/619, 620; 564/399, 475; 536/120

[56] References Cited

U.S. PATENT DOCUMENTS

| 2,520,612 | 8/1950 | Roberts et al. . |
| 2,674,619 | 4/1954 | Lundsted . |
| 2,677,700 | 5/1954 | Jackson et al. . |
| 2,921,920 | 1/1960 | Smith et al. . |
| 3,036,118 | 5/1962 | Jackson et al. . |
| 3,393,242 | 7/1968 | Seale et al. . |
| 3,393,243 | 7/1968 | Cuscurida . |
| 4,587,365 | 5/1986 | Anchor . |
| 4,606,837 | 8/1986 | McEntire et al. . |
| 4,764,567 | 8/1988 | Ott .................................. 525/409 X |

FOREIGN PATENT DOCUMENTS 450844 2/1964 United Kingdom .

Primary Examiner—Howard T. Mars
Attorney, Agent, or Firm—Cary W. Brooks

[57] ABSTRACT

A process is disclosed for the preparation of capped polyoxyalkylene block polyethers with exceptionally low hydroxyl numbers and correspondingly high capping efficiency. This improvement is accomplished through the use of cesium hydroxide catalysis during oxyethylation.

20 Claims, No Drawings

PROCESS FOR PREPARING CAPPED POLYOXYALKYLENE BLOCK POLYETHERS

This application is a continuation in part of copending application Ser. No. 933,143 filed Nov. 21, 1986 now abandoned.

BACKGROUND OF THE INVENTION

1. Field of the Invention

The present invention relates to capped polyoxyalkylene block polyethers. More particularly, the invention relates to an improved process for preparing such capped polyoxyalkylene block polyethers in high yield.

2. Description of the Related Art

Polyoxyalkylene block polyethers are well known commercial products having many uses, the most important of which is their use as nonionic surfactants. Polyoxyalkylene block polyether surfactants generally have both hydrophobic and hydrophilic blocks, and are described, for example, by Lundsted in U.S. Pat. No. 2,674,619 and by Jackson and Lundsted in U.S. Pat. Nos. 2,677,700 and 3,036,118. These references also disclose the preparation of such polyoxyalkylene block polyethers by oxypropylating an initiator molecule possessing two or more active hydrogens in the presence of a basic catalyst such as sodium or potassium hydroxide. The polyoxypropylene hydrophobe is then oxyethylated to produce external hydrophiles, or, in certain cases, the oxypropylation and oxyethylation may be reversed to produce "reverse" non-ionic surfactants having an internal hydrophile and external hydrophobes.

Although such polyoxyalkylene block polyethers have proven to be useful n many fields, certain applications have required properties not available without modifying their basic structure. One such modification which has proven useful is capping, or "end-capping."

Normal polyoxyalkylene block polyethers are hydroxyl terminated. Frequently, the nature of hydroxyl functionality is such as to impart undesirable properties in specific applications. When the polyoxyalkylene block polyether is difunctional, one of the hydroxyl functionalities may be eliminated by the expedient of beginning with a monofunctional initiator and appropriately altering the sequence of oxyalkylation.

For example, a tri-block polyoxyalkylene polyether may be conventionally prepared, as shown in the reaction scheme below, by first oxypropylating a difunctional initiator molecule followed by oxyethylation. In these reaction schemes, —OP— and —PO— represent oxypropyl residues derived from propylene oxide while —OE— and —EO— represent analogously derived oxyethyl groups.

Step 1: $HO-CH(CH_3)-CH_2-OH$ (propylene glycol) $+ 2n\ CH_2-CH(CH_3)-O$ (propylene oxide) $\longrightarrow$ $H{-}(OP)_{\overline{n}}O-CH(CH_3)-CH_2-O{-}(PO)_{\overline{n}}H$ polyoxypropylene hydrophobe Step 2: $H{-}(OP)_{\overline{n}}O-CH(CH_3)-CH_2-O{-}(PO)_{\overline{n}}H\ +$ $2m\ CH_2-CH_2-O$ (ethylene oxide) $\longrightarrow$ $H{-}(OE)_{\overline{m}}{-}(OP)_{\overline{n}}OCH(CH_3)-CH_2-O{-}(PO)_{\overline{n}}{-}(EO)_{\overline{m}}H.$ An analogous monofunctional, mono-capped tri-block polymer may be prepared by starting with a monol, R—OH, such as methanol, butanol, fatty alcohols, alkylphenols, or benzyl-alcohol and altering the oxyalkylation sequence as follows:

Step 1: $R-OH + m\ CH_2-CH_2-O \longrightarrow R-O{-}(EO)_{\overline{m}}H$

Step 2: $R-O{-}(EO)_{\overline{m}}H + (2n+1)\ CH_2-CH(CH_3)-O \longrightarrow$ $R-O{-}(EO)_{\overline{m}}{-}(PO)_{\overline{2n+1}}H$ Step 3: $R-O{-}(EO)_{\overline{m}}{-}(PO)_{\overline{2n+1}}H + m\ CH_2-CH_2-O \longrightarrow$ $R-O{-}(EO)_{\overline{m}}{-}(PO)_{\overline{2n+1}}{-}(EO)_{\overline{m}}H.$ Such mono-capped block polyethers where the cap is joined to the block polyether by an ether linkage are hydrolytically stable and have been shown to possess substantially different physical and chemical properties as compared to their non-capped analogues, including modified surface activity and increased thermal stability.

Unfortunately, this method cannot be used without further modification to prepare di-capped block polyethers. In the past, similar di-capped block polyethers could be prepared by first forming a mono-capped polyether and then joining two such polyethers utilizing a difunctional "linking" or "bridging" reagent. For example, in the process below, a diisocyanate is used as the "linking" reagent.

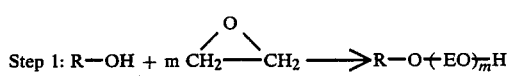

Step 1: $R-OH + m\ CH_2-CH_2-O \longrightarrow R-O{-}(EO)_{\overline{m}}H$

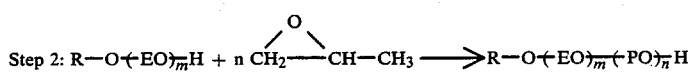

Step 2: $R-O{-}(EO)_{\overline{m}}H + n\ CH_2-CH(CH_3)-O \longrightarrow R-O{-}(EO)_{\overline{m}}{-}(PO)_{\overline{n}}H$ Step 3: $2\ R-O+EO\}_{\overline{m}}+PO\}_{\overline{n}}H + OCN-R'-NCO \longrightarrow R-O+EO\}_{\overline{m}}+PO\}_{\overline{n}}\overset{O}{\overset{\|}{C}}-NH-R'-NH-\overset{O}{\overset{\|}{C}}+OP\}_{\overline{n}}+OE\}_{\overline{m}}O-R$ The nature of R' in the diisocyanate may be aliphatic or aromatic. Unfortunately, such compounds contain two urethane linkages which are less stable, both hydrolytically and thermally, than a purely ether linked molecule.

An alternative to such a process is the preparation of a mono- or difunctional molecule followed by monocapping or dicapping, respectively, utilizing traditional capping reagents. Such capping is traditionally performed, for example, as in U.S. Pat. No. 3,393,242, by means of reaction of the hydroxyl functional polyether with an alkali metal or alkali metal alkoxide followed by reaction with an alkyl halide. For example:

Step 1: R—O+polyoxyalkylene+OH + NaOCH₃ ⟶

R—O+polyoxyalkylene+ONa + CH₃OH

Step 2: R—O+polyoxyalkylene+ONa + CH₃Cl ⟶

R—O+polyoxyalkylene+OCH₃ + NaCl.

A methyl capped polyether is the result. Other capping agents such as dialkylsulfates may also be used in this process in place of the alkyl halide.

Unfortunately, the process of capping polyethers just described is subject to the disadvantage that the capping efficiency seldom, if ever, approaches 100 percent of theoretical. Even when an excess of the relatively expensive capping reagents are utilized, the capping efficiency does not generally exceed 90 percent of theoretical and is frequently far less.

It has now been surprisingly discovered that exceptionally high capping efficiencies may be obtained through the use of conventional capping procedures so long as cesium hydroxide is utilized as the polyoxyalkylation catalyst rather than conventional potassium or sodium hydroxide catalysts. The use of cesium hydroxide as a catalyst has not been previously suggested for the preparation of block polyether polyols.

The use of cesium hydroxide as a polyoxypropylation catalyst has been proposed in U.S. Pat. No. 3,393,243. According to this reference, the use of cesium hydroxide as opposed to conventional sodium or potassium hydroxide catalysts in the synthesis of polyoxypropylene glycols prevents the elimination reaction at the polyether chain terminus which ordinarily results in forming allylic unsaturation and, at the same time, lowers and broadens the molecular weight of the product polyoxypropylene glycols.

A mechanism for the elimination disclosed in U.S. Pat. No. 3,393,243 is discussed in Ceresa, Block and Graft Copolymerization, vol. 2, published by Wiley-Interscience, at page 18. The mechanism apparently involves hydrogen abstraction via a cyclic transition state and may be represented as follows:

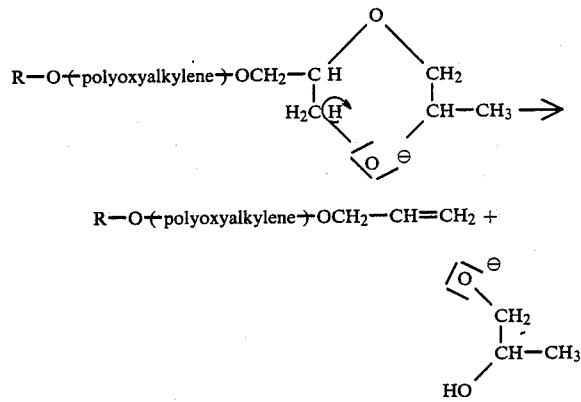

The unsaturation formed increases as a direct function of equivalent weight. Eventually conditions are established wherein further propylene oxide addition fails to increase the molecular weight.

When oxyethylation rather than oxypropylation is performed, as in the preparation of block polyethers, the use of cesium hydroxide as a catalyst has not been contemplated. The reason for this is that while it is readily conceived that polyoxypropylene glycols may undergo elimination by the above mechanism, the same cannot be true for polyoxyethylene glycols or for oxyethylated polyoxypropylene glycols containing more than one oxyethyl group. Thus, until now, such block polyethers have been prepared with less expensive sodium and potassium hydroxide catalysts.

For example, when a single oxyethyl group is added to a polyoxypropylene glycol, the elimination mechanism may be written thusly:

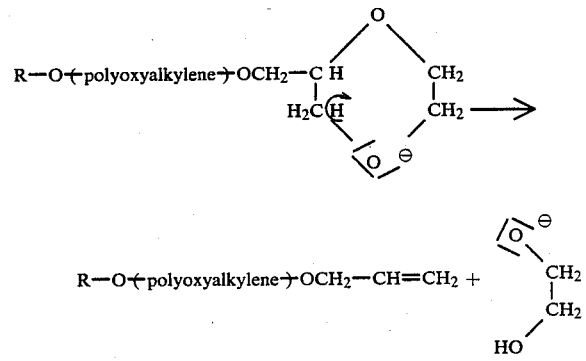

However, when more than one oxyethyl group is present, this transition state cannot be achieved:

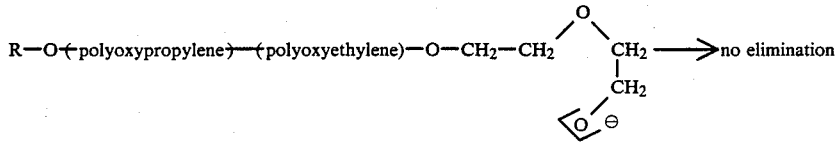

Consequently, no elimination, no unsaturation formation, and therefore no lowering of molecular weight is expected during ethylene oxide addition, and, in fact, none has been detected heretofore.

SUMMARY OF THE INVENTION

It has now been surprisingly discovered, contrary to previous belief, that unsaturation is produced not only during the preparation of polyoxypropylene glycols during oxypropylation of a suitable initiator, but is also formed during oxyethylation as well. The combination of unsaturation formed during both phases of preparation of polyoxyalkylene block polyethers and the resultant effect on the stoichiometry precludes successful, economic capping of these polyethers. These effects may be avoided by utilizing cesium hydroxide as the oxyalkylation catalyst during oxyethylation as well as oxypropylation.

Thus while the greatest increase in capping efficiency will occur when cesium hydroxide is the catalyst for both oxypropylation and all oxyethylations, increases in capping efficiency will also occur when at least oxyethylation is performed utilizing cesium hydroxide. This would be most common when diblock or tri-block polyethers are prepared on an industrial scale from a common intermediate. For example, a polypropylene glycol might be prepared conventionally using potassium hydroxide catalysis, and this glycol then used to prepare various tri-block copolymers by the addition of ethylene oxide using cesium hydroxide catalyst. As long as cesium hydroxide is used for at least one of the oxyethylations, an increase in capping efficiency is expected.

DESCRIPTION OF THE PREFERRED EMBODIMENTS

The process of the subject invention applies to the capping of any polyoxyalkylene block polyether containing one or more polyoxyethylene hydrophiles. Most preferably, the polyoxyalkylene polyethers are monocapped polyoxyalkylene block polyethers prepared by sequentially oxyethylating, oxypropylating, and again oxyethylating an appropriate monol. However, conventional, non-capped polyoxyalkylene di- and higher hydroxyl functional polyethers may also be subjected to the subject process.

The polyoxyalkylene polyethers to be capped are prepared by conventional methods, with the exception that the oxyethylation, and preferably both the oxyethylation and oxypropylation (or oxyalkylation with another higher alkylene oxide, i.e., butylene oxide) of the initiator or intermediate are catalyzed with cesium hydroxide as opposed to conventional sodium or potassium hydroxide catalysis.

The oxyalkylations are performed sequentially, i.e., the various alkylene oxides are added substantially as individual components and not as mixtures. By the term "sequential oxyalkylating," as found in the claims, is meant just such oxyalkylation with substantially pure alkylene oxides but with the sequence of oxyalkylation in any order. Thus oxyethylation may be followed by oxypropylation, or the reverse.

Suitable initiators contain at least one active hydrogen which is capable of undergoing oxyalkylation. Examples are aliphatic monols, diols, and polyols such as methanol, ethanol, propanol, butanol, fatty alcohols, ethylene glycol, propylene glycol, butylene glycol, glycerine, glucose, sucrose, and methyl and ethyl carbitols; phenols such as octyl and nonyl phenol, hydroquinone, resorcinol, bis(4-hydroxyphenyl)methane; cycloaliphatic alkanols such as cyclohexanol, and 1,4-cyclohexane diol; aliphatic cycloaliphatic alkanols such as cyclohexane dimethanol, and the like. Also suitable are compounds containing primary or secondary amino groups such as ethylenediamine, aniline, N-methyl aniline, aliphatic amines such as laurylamine, and mixed hydroxyl and amine functional compounds such as p-aminophenol. This list is illustrative only and not exhaustive.

When the polyoxypropylene or higher alkylene oxide-derived hydrophobe is prepared first by oxyalkylating a mono-, di-, or higher functional initiator such as methanol, butanol, ethylene glycol, propylene glycol, butylene glycol, glycerine, tetrakis (2-hydroxypropyl)-ethylenediamine or the like, potassium hydroxide may be used as the initial catalyst, especially when the hydrophobe is of modest equivalent weight, i.e., equivalent weights of less than 2000, preferably less than 1500. However, in this case, the residual potassium hydroxide catalyst is preferably removed prior to additional oxypropylation to higher molecular weights, and, in any case, before oxyethylation. The mechanics of polyether preparation are otherwise conventional and well known to those skilled in the art. Examples of such preparation may be found, for example, in the treatise by Schick entitled *Nonionic Surfactants*, and in U.S. Pat. Nos. 2,674,619, 2,677,700, and 3,036,118, which are herein incorporated by reference.

The amount of cesium hydroxide catalyst utilized is the same as that utilized when sodium hydroxide or potassium hydroxide is the catalyst, on a mole-to-mole basis. Generally, from 0.005 percent to about 5 percent, preferably from 0.005 to 2.0 percent, and most preferably 0.005 percent to 0.5 percent by weight of catalyst relative to the finished product is utilized. The catalyst composition during oxyethylation should contain a major part of cesium hydroxide. Up to 50 mole percent of potassium or sodium hydroxide may be tolerated, however, generally less than 20 mole percent, and preferably less than 10 mole percent of non-cesium hydroxide catalysts relative to total catalyst is desirable. Cesium methoxide and other highly basic cesium salts may also be used if desired. Basic cesium-containing catalysts may be selected from the group consisting of cesium oxide, cesium acetate, cesium carbonate, and cesium alkoxides of $C_1$-$C_8$ lower alkanols.

The hydrophobe of the polyoxyalkylene block polyethers of the subject invention are derived from a higher alkylene oxide, or from tetrahydrofuran. By the term "higher alkylene oxide" is meant alkylene oxides having from 3 to about 18 carbon atoms in the alkylene moiety. While the hydrophobe is preferably a polyoxypropylene hydrophobe, other hydrophobes based on higher alkylene oxides such as 1,2-butylene oxide and 2,3-butylene oxide may also be used. Although not preferred, the hydrophobe also can be derived from $C_8$ to $C_{18}$ olefin oxides, or from the polymerization of tetrahydrofuran. The preferred oxyalkylation temperature is from 100° C. to 145° C. at a pressure of less than about 95 psig.

Capping of the block polyethers may be performed in the conventional manner, for example as detailed in U.S. Pat. No. 3,393,242, which is incorporated herein by reference. Generally speaking, the capping is performed by converting the polyoxyalkylene block polyether to its alkali metal salt by the use of a metalizing reagent selected from the group of the hydrides and alkoxides of the alkali metals, alkaline earth metals and aluminum metal or strong alkali metal base, e.g., sodium metal, sodium hydride or sodium methoxide. The polyoxyalkylene salt is then reacted with a suitable alkyl, cycloalkyl, or aralkyl halide. The reagents are generally utilized in approximately a 10 percent molar excess based upon the functionality of the polyether.

The examples which follow serve to illustrate the process of the subject invention. All polyethers are prepared by conventional techniques with the exception of the particular catalyst utilized. The oxyalkylation is performed in a stainless steel high pressure stirred autoclave. The initial charge, consisting of initiator or intermediate base and catalyst is vacuum stripped at a temperature of from about 90° C. to 125° C. and a pressure of c.a. 10 torr to remove water and any other volatiles. The propylene oxide and ethylene oxide feed rates are adjusted so as to maintain the reactor pressure at 95 psig or below, including a 45 psig nitrogen pad.

UNSATURATION FORMATION DURING ETHYLENE OXIDE ADDITION

A block polyether is prepared conventionally as described above. The initiator is tetrakis[2-hydroxypropyl]ethylenediamine which is oxypropylated at a temperature of 100° C., using conventional KOH catalysis at a catalyst concentration of 0.08 percent by weight relative to the final product (post oxyethylation) weight. Following oxypropylation, a portion of the oxypropylated intermediate base is treated with magnesium silicate to remove residual KOH catalyst and analyzed. The c.a. 3900 Dalton molecular weight product has an unsaturation, expressed as mg. of KOH per gram of polyether, of 0.008. The remainder of the intermediate base is reacted at a temperature of 160° C. with sufficient ethylene oxide to produce a polyoxypropylenepolyoxyethylene tetrol having a nominal molecular weight, based on ethylene oxide charged, of 39,500 Daltons. This product is treated with magnesium silicate to remove residual KOH catalyst and analyzed. The product has a measured unsaturation of 0.054 meq KOH/g.

This example illustrates that unsaturation is formed during ethylene oxide addition as well as during propylene oxide addition, a phenomenon not previously known. It was expected that unsaturation produced during oxypropylation would be "diluted" during ethylene oxide addition. The finished product, which has a molecular weight approximately ten times higher than the polyoxypropylene polyether intermediate base, would therefore have an unsaturation one-tenth as great, or approximately 0.0008 meq KOH/g. However, instead of this very low, almost insignificant level of unsaturation, the finished product shows an unsaturation of 0.054 meq KOH/g, some seven times higher than the intermediate base, and sixty-seven times higher than expected! The elimination mechanism discussed previously cannot account for any of this large increase in unsaturation.

COMPARATIVE EXAMPLES 1-4

Polyether Preparation

Several monocapped, tri-block polyethers are prepared conventionally through KOH catalysis. The initiator in each case is propylene glycol. The hydrophobe is prepared by the addition of 32 moles of propylene oxide forming a hydrophobe having a molecular weight of approximately 1900 Daltons. The final hydrophiles are prepared by adding ethylene oxide at a temperature of 145° C. The reactor is maintained at the reaction temperature following the final ethylene oxide addition for a time sufficient to ensure that virtually all the ethylene oxide has reacted. The product is then vacuum stripped and the catalyst removed by treatment with magnesium silicate. The two polyethers produced by this process, polyethers A and B, contain 6.4 and 28 moles of ethylene oxide, respectively, and have molecular weights of c.a. 2200 Daltons and 3100 Daltons. Both tri-block polyethers correspond to the structure:

Capping

The polyethers prepared above are capped by first forming the sodium salt of the monocapped polyethers by stripping for 30 minutes at 125° C. and <10 torr pressure, padding with nitrogen, and reacting with a 5 or 10 percent molar excess of sodium methoxide, $NaOCH_3$. Following removal of methyl alcohol in vacuuo, the reaction mass is cooled to 70° C. and padded with nitrogen. The methyl dicapped product is prepared by addition of a 5 or 10 percent molar excess of methyl chloride over a time period of about two hours. The amount of capping reagent is determined from the hydroxyl numbers of the uncapped polyethers. After a four hour reaction period, any excess methyl chloride plus by-product dimethyl ether is removed by stripping in vacuuo. The dicapped polyethers correspond to the formula:

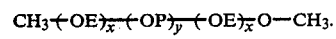

Table I summarizes the results of capping conventionally prepared polyethers and B where a KOH catalyst is used as the oxyalkylation catalyst.

TABLE I

| Comparative Example | Polyether | Capping Reagent Molar Excess, % | Dicapped Polyether Hydroxyl Number[1] | Capping Efficiency[2] |
|---|---|---|---|---|
| 1 | A | 5 | 11.6 | 79.3 |
| 2 | A | 10 | 7.9 | 85.9 |

TABLE I-continued

| Comparative Example | Polyether | Capping Reagent Molar Excess, % | Dicapped Polyether Hydroxyl Number[1] | Capping Efficiency[2] |
|---|---|---|---|---|
| 3 | A | 10 | 12.0 | 78.6 |
| 4 | B | 10 | 5.6 | 85.7 |

[1]The theoretical hydroxyl number of a fully capped polyether is zero.
[2]The capping efficiency is defined as $$\left[ 1 - \frac{\text{OH\# capped polyether}}{\text{OH\# uncapped polyether}} \right] \times 100\%$$

Table I indicates that even with 10 percent molar excess of capping reagents the products still retain appreciable hydroxyl numbers, indicating considerable amounts of hydroxyl terminated polyether still present. Table I also indicates that the capping efficiency at 10 percent molar excess of expensive capping reagents averages only about 84 percent.

EXAMPLES 5-6

Two monomethyl capped tri-block polyethers are prepared using cesium hydroxide as the oxyalkylation catalyst. The initiator is methyl carbitol. Initial oxyalkylation is with ethylene oxide at a temperature of 135° C. to form a hydrophile whose equivalent weight is one-half the total hydrophile weight. Following initial ethylene oxide addition, the polyoxypropylene hydrophobe is prepared by the addition of approximately 32 moles of propylene oxide at a temperature of 115°, forming a hydrophobe having a weight of approximately 1900 Daltons. The terminal hdrophile is formed by the addition of the appropriate amount of ethylene oxide, again at 135° C. The two polyethers produced by this process, polyethers A1 and B1, contain 6.4 and 28 moles of ethylene oxide and have molecular weights of 2000 and 3200 Daltons, respectively.

Dicapped polyethers are prepared from the monomethyl capped polyethers by the same procedure utilized in Comparative Examples 1-4. A 10 percent molar excess of capping reagents calculated from the polyethers' hydroxyl numbers is used. The results of the capping operation are summarized in Table II.

TABLE II

| Example | Polyether | Capping Reagent Molar Excess, % | Dicapped Polyether Hydroxyl Number | Capping Efficiency |
|---|---|---|---|---|
| 5 | A1 | 10 | 2.1 | 96.3 |
| 6 | B1 | 10 | 1.4 | 96.6 |

As can be seen from the table, the capping efficiency is much higher than the capping efficiencies of the comparative polyethers. The hydroxyl numbers are also correspondingly lower. To achieve such high capping efficiencies and low hydroxyl numbers with conventionally catalyzed polyethers, if at all possible, would require minimally a 30 to 40 percent molar excess of expensive capping reagents, rendering such a process economically unattractive, and resulting in products having exceptionally high cost to the consumer.

EXAMPLE 7 AND COMPARATIVE EXAMPLE 8

Two monocapped tri-block polyethers were prepared by oxyalkylating 330 g. of methoxyethoxyethanol with ethylene oxide, propylene oxide, and then ethylene oxide again. The catalyst in Example 7 is cesium hydroxide. The catalyst in Comparative Example 8 is potassium hydroxide. Both catalysts were present in amounts of 0.074 moles.

Due to reactor size constraints, the respective polyethers were made in two steps. In the first step, 171 g. ethylene oxide was reacted followed by 2000 g. propylene oxide, resulting in approximately 2500 grams of product. These intermediates were then reacted with an additional 1068 grams of propylene oxide followed by 165 grams of ethylene oxide. The resulting monomethyl capped polyoxyethylenepolyoxypropylenepolyoxyethylene tri-block polyethers had hydroxyl numbers of 34.4 for the potassium hydroxide catalyzed polyether corresponding to a molecular weight of about 1631 Daltons; and 31.6 for the cesium hydroxide catalyzed polyether, corresponding to a molecular weight of 1775 Daltons.

Each of the polyethers was reacted with sodium methoxide as previously described, in a mole ratio of 1.09 moles NaOCH$_3$/1.00 mole polyether. After stripping for four hours, methylchloride at a mole ratio of 1.09 mole methylchloride/1.00 mole polyether was added. Following reaction for four hours, the products were purified as before and found to have final hydroxyl numbers of 5.9 (82.8% capping efficiency) for the potassium hydroxide catalyzed product; and 1.4 (95.6% capping efficiency) for the cesium hydroxide catalyzed product. The results are summarized below in Table III.

TABLE III

| | Example 7 | Comparative Example 8 |
|---|---|---|
| oxyalkylation catalyst | CsOH | KOH |
| OH# | 31.6 | 34.4 |
| calculated molecular wt. | 1775 | 1631 |
| sodium methoxide/polyether molar ratio | 1.09/1.00[1] | 1.09/1.00[2] |
| methyl chloride/polyether molar ratio | 1.09/1.00[1] | 1.09/1.00[2] |
| Final OH# | 1.4 | 5.9 |
| Capping efficiency | 95.6% | 82.8% |

[1]1.290 moles NaOCH$_3$; 1.290 moles CH$_3$Cl
[2]1.356 moles NaOCH$_3$; 1.356 moles CH$_3$Cl The embodiments of the invention in which an exclusive property or privilege is claimed are defined as follows:

1. A process for the preparation of capped polyoxyalkylene block polyethers, comprising:
    (a) sequentially oxyalkylating an initiator molecule having one or more active hydrogens
        (i) with ethylene oxide in the presence of a basic cesium-containing catalyst; and
        (ii) one or more higher alkylene oxides in the presence of a basic oxyalkylation catalyst; and
    (b) capping the product of step (a) to form an alkyl, cycloalkyl, or aralkyl ether terminated polyoxyalkylene block polyether.

2. The process of claim 1 wherein said basic cesium-containing catalyst comprises cesium hydroxide.

3. The process of claim 1 wherein said higher alkylene oxide is selected from the group consisting of propylene oxide and butylene oxide.

4. The process of claim 3 wherein said basic cesium-containing catalyst is utilized for both oxyalkylation with ethylene oxide and oxyalkylation with one or more higher alkylene oxides.

5. The process of claim 3 wherein said basic catalyst is potassium hydroxide.

6. The process of claim 3 wherein said basic catalyst is a mixture comprising potassium hydroxide and cesium hydroxide.

7. The process of claim 3 wherein said capping is accomplished by reacting a metalized polyether with a capping reagent selected from the group consisting of alkyl, cycloalkyl, and aralkyl halides.

8. The process of claim 3 wherein said capping is accomplished by reacting a metalized polyether with a capping reagent selected from the group consisting of alkyl, cycloalkyl, and aralkyl sulfates.

9. A process for the preparation of a capped polyoxyalkylene block polyether comprising (a) sequentially oxyalkylating an initiator having the formula

wherein R is alkyl, cycloalkyl, alkyl or aralkyl, R' is ethylene, propylene, isopropylene, or butylene, and n is a natural number from 0 to about 30, with two or more alkylene oxides at least one of which is ethylene oxide, wherein said oxyalkylation with ethylene oxide take place in the presence of a basic cesium-containing catalyst, and (b) capping the resulting monohydroxyl functional polyoxyalkylene block polyether to form an alkyl, cycloalkyl, or aralkyl ether terminated polyoxyalkylene block polyether.

10. The process of claim 9 wherein said initiator is selected from the group consisting of methanol, ethanol, propanol, butanol, 2-ethylhexanol, methyl carbitol, ethyl carbitol, octylphenol, nonylphenol, and $C_8$–$C_{18}$ alcohols.

11. The process of claim 9 wherein a catalyst comprising cesium hydroxide is utilized for all oxyalkylations.

12. The process of claim 10 wherein a catalyst comprising cesium hydroxide is utilized for all oxyalkylation.

13. The process of claim 9 wherein said capping is accomplished through reaction with a capping reagent selected from the group consisting of alkyl, cycloalkyl, and aralkyl halides.

14. The process of claim 9 wherein said capping is accomplished through reaction of a capping reagent selected from the group consisting of alkyl, cycloalkyl, and aralkyl sulfates.

15. The process of claim 1 wherein said basic cesium-containing catalyst is selected from the group consisting of cesium oxide, cesium acetate, cesium carbonate, and the cesium alkoxides of $C_1$–$C_8$ lower alkanols.

16. The process of claim 3 wherein said basic cesium-containing catalyst is selected from the group consisting of cesium oxide, cesium acetate, cesium carbonate, and the cesium alkoxides of $C_1$–$C_8$ lower alkanols.

17. The process of claim 9 wherein said basic cesium-containing catalyst is selected from the group consisting of cesium oxide, cesium acetate, cesium carbonate, and the cesium alkoxides of $C_1$–$C_8$ lower alkanols.

18. The process of claim 10 wherein said basic cesium-containing catalyst is selected from the group consisting of cesium oxide, cesium acetate, cesium carbonate, and the cesium alkoxides of $C_1$–$C_8$ lower alkanols.

19. The process of claim 7 wherein said metallized polyether is prepared by reacting the polyether prepared in steps (a)(i) and (ii) with a metalizing reagent selected from the group consisting of the hydrides and alkoxides of the alkali metals, alkaline earth metals, and aluminum metal.

20. The process of claim 8 wherein said metallized polyether is prepared by reacting the polyether prepared in steps (a)(i) and (ii) with a metalizing reagent selected from the group consisting of the hydrides and alkoxides of the alkali metals, alkaline earth metals, and aluminum metal.

* * * * *